United States Patent [19]

Kawai et al.

[11] Patent Number: 4,555,074
[45] Date of Patent: Nov. 26, 1985

[54] WEBBING RETRACTOR

[75] Inventors: Osamu Kawai; Katsuyasu Ono, both of Fujisawa, Japan

[73] Assignee: NSK-Warner K.K., Japan

[21] Appl. No.: 513,071

[22] Filed: Jul. 12, 1983

[30] Foreign Application Priority Data

Jul. 19, 1982 [JP] Japan .......................... 57-108999[U]

[51] Int. Cl.[4] ........................ A62B 35/02; B65H 75/48
[52] U.S. Cl. ............................................. 242/107.4 A
[58] Field of Search ................ 242/107.4 R, 107.4 E, 242/107; 280/805, 806, 807; 297/474–480

[56] References Cited

U.S. PATENT DOCUMENTS

| | | | |
|---|---|---|---|
| 3,430,891 | 3/1969 | Burleigh | 242/107.4 A |
| 4,127,240 | 11/1978 | Kell | 242/107.4 A |
| 4,223,853 | 9/1980 | Ernst | 242/107.4 R |
| 4,230,289 | 10/1980 | Fohl | 242/107.4 A |
| 4,366,934 | 1/1983 | Seifert et al. | 242/107.4 A |

Primary Examiner—John M. Jillions
Attorney, Agent, or Firm—McGlew and Tuttle

[57] ABSTRACT

Disclosed herein is a webbing retractor suitable for use with a vehicle seat belt. It comprises a casing equippd with a pair of side plates, a take-up spindle, a cogwheel provided outside one of the side plates in such a way that is allowed to rotate together with the take-up spindle, a lock member supported directly or via an attachment member by at least one of the side plates in such a manner that the lock member is displaceable between a first position where it is kept in engagement with the cogwheel and a second position where it is out of engagement with the cogwheel, and an auxiliary plate disposed outside the cogwheel substantially as an integral unit with the one of the side plates. When an undue force is exerted on the take-up spindle, at least either one of the take-up spindle, the cogwheel and the lock member or attachment is brought into engagement or contact with the auxiliary plate and the webbing retractor is thus protected from any further deformation.

3 Claims, 17 Drawing Figures

WEBBING RETRACTOR

BACKGROUND OF THE INVENTION (1) Field of the Invention

This invention relates to a webbing retractor suitable for use with a vehicle seat belt, and more particularly to such a webbing retractor that is durable against high tensile forces which may be applied to the webbing in the event of emergencies.

(2) Description of the Prior Art

Webbing retractors of the type as shown in FIGS. 1(a) and 1(b) have found wide-spread commercial utility for seat belts in recent years. Namely, a take-up spindle 3 carrying a cogwheel 2 provided thereon and a lock lever 4 are inserted in a casing 1 from the outside (i.e., in the direction indicated by X in the figure). Then, a webbing W of a desired color is inserted through a slot 5 of the take-up spindle 3 and a slip-off preventive bar 7 is caused to extend through a looped end portion 6 so as to fasten the webbing W on the take-up spindle 3. In the event of an emergency such as a vehicle collision or the like, a sensor mechanism 8 is actuated to bring a pawl 9 of the lock lever 4 into engagement with the cogwheel 2, thereby inhibiting the take-up spindle 3 from any further rotation and preventing any further release of the webbing W.

However, webbing retractors of the above sort involve a possible danger that, because the cogwheel 2 and the pawl 9 of the lock lever 4—which pawl 9 is engageable with the cogwheel 2—are located outside a side plate 10 of the casing 1, the lock lever 4 and cogwheel 2 are held together only at their proximal ends just like cantilevers and they may undergo deformation and may eventually be disengaged when an extremely heavy load is exerted in the event of an emergency or the like. Furthermore, the side plate 10 defines a relatively large hole 11 so as to permit the take-up spindle 3 to extend therethrough. Provision of such a hole has reduced the strength of the casing 1, resulting in another possible danger that the casing 1 might be deformed under the influence of even a small load.

A variety of exemplary structural failures are schematically illustrated in FIGS. 2 through 6. FIG. 2 illustrates the take-up spindle 3 pulled in the upper right direction. Both side plates of the casing 1 have been deformed and are now aligned in the pulled direction. This has pushed the cogwheel 2 outwardly, leading to disengagement of the cogwheel 2 from the lock lever 4.

FIG. 3(a) illustrates the directions of forces produced when the rotation of the cogwheel 2 in the direction indicated by A has been restrained. The take-up spindle 3 is subjected to a force exerted in the direction indicated by B while the lock lever 4 is exerted by a force in the direction shown by C. In FIG. 3(b), the hole 11 has been deformed into an elongated hole due to the application of the force in the direction indicated by B and the take-up spindle 3 has been allowed to move in the upper right direction, resulting in disengagement of the cogwheel 2 from the lock lever 4. Incidentally, such a movement of the take-up spindle can be positively utilized to construct an emergency locking mechanism as disclosed, for example, in U.S. Pat. No. 4,101,094 issued July 18, 1978 to Wallin and U.S. Pat. No. 4,350,313 issued Sept. 21, 1982 to Adomeit, although the structure of such an emergency locking mechanism is obviously different from the structure shown in FIG. 3(b). In FIG. 3(c), the lock lever 4 has been shifted in the lower left direction due to the application of the force in the direction indicated by C, also resulting in disengagement of the cogwheel 2 from the lock lever 4. Incidentally, U.S. Pat. No. 3,960,339 issued June 1, 1976 to Fisher discloses a retractor making, on the contrary, effective use of such a movement of the lock lever.

FIG. 4 illustrates an outwardly-bent cogwheel 2. In FIG. 5, the pawl 9 of the lock lever 4 has been bent downwardly. In these examples of deformation, the point of engagement between the cogwheel 2 and the pawl 9 of the lock lever 4 is progressively shifted away from the side plate 10 once the deformation starts and the deformation is thus promoted further as the bending moment becomes greater.

In addition, FIG. 6 illustrates a lock lever 4 in which the pawl 9 has been deformed in the rotary direction of the cogwheel because the pawl 9 was subjected to a rotary force produced at the take-up spindle.

If any one of the above types of disengagement takes place, the take-up spindle is caused to rotate and the webbing is thus paid out, thereby failing to protect the occupant safely.

SUMMARY OF THE INVENTION

With the foregoing in view, an object of this invention is to provide a webbing retractor in which the take-up spindle is prohibited from rotation without any failure even when a load is applied thereto.

In one aspect of this invention, there is thus provided a webbing retractor which comprises a casing equipped with a pair of side plates, a take-up spindle rotatably supported by the side plates and having a webbing fastened to the take-up spindle at one end thereof, a cogwheel provided outside one of the side plates in such a way that it is allowed to rotate together with the take-up spindle, a lock member supported directly or via an attachment member by at least one of the side plates in such a manner that the lock member is displaceable between a first position where the lock member is kept in engagement with the cogwheel and a second position where the lock member is out of engagement with the cogwheel, and an auxiliary plate disposed outside the cogwheel substantially as an integral unit with the one of the side plates, thereby bringing at least either one of the take-up spindle, the cogwheel and the lock member or attachment member into engagement with the auxiliary plate when a tensile force is applied to the webbing.

The webbing retractor according to the present invention brings about such excellent effects that the engagement between the cogwheel and the lock member is maintained without any failure and the take-up spindle is thus prohibited from rotation, thereby protecting the occupant safely.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENTS

Figure 7:
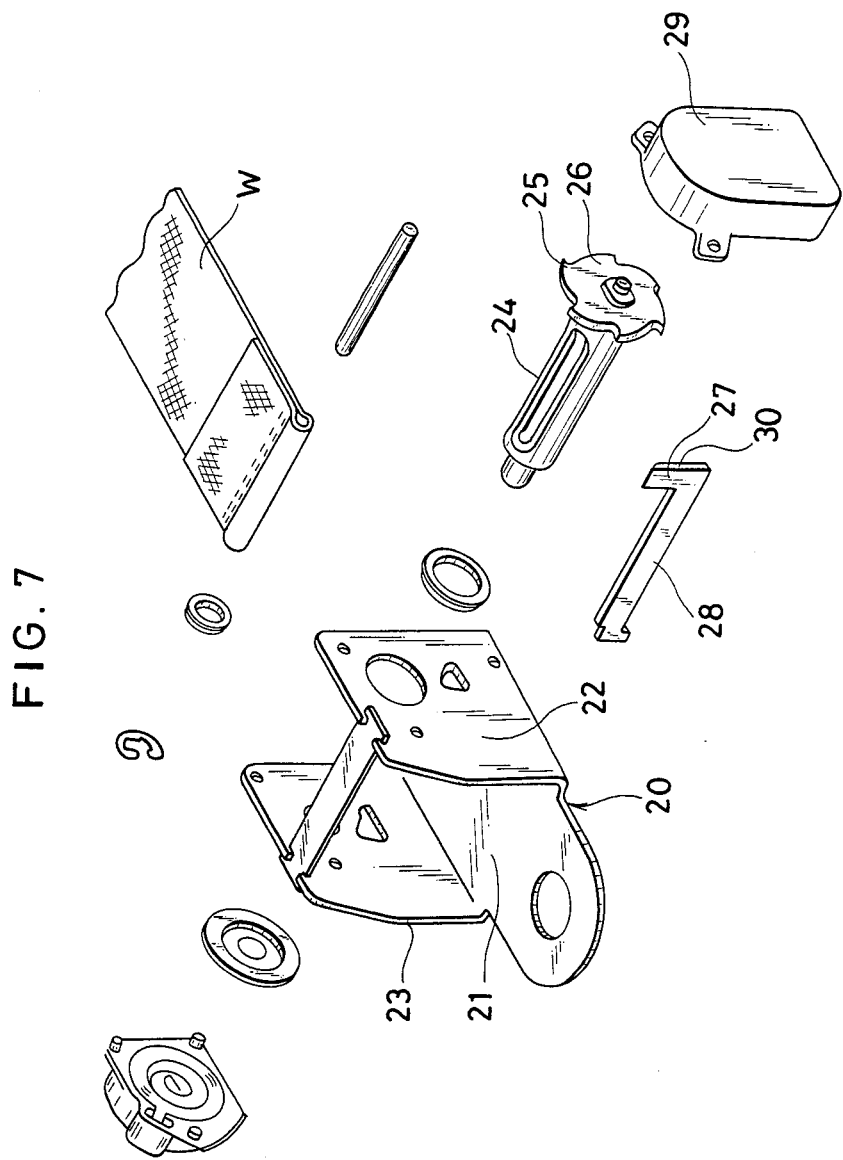
FIG. 7 is an exploded, schematic view of a webbing retractor according to the first embodiment of this invention.
Figure 8:
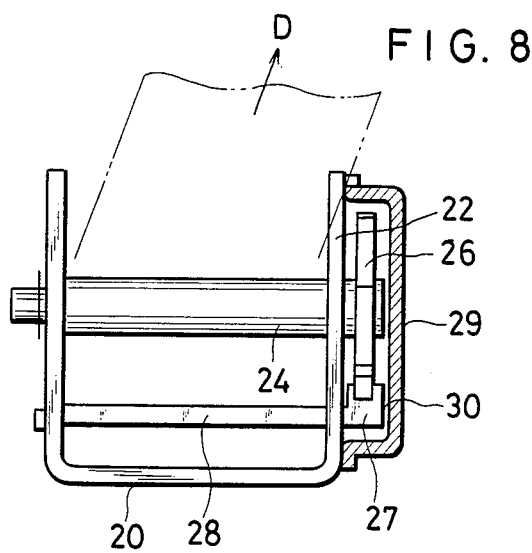
FIG. 8 is a front view of the webbing retractor of FIG. 7.

Referring first to FIGS. 7 and 8, a casing 20 has a base 21 and a pair of side plates 22,23 extending upright, i.e., in the vertical direction from the base 21. A take-up spindle 24 is rotatably supported on the side plates 22,23 and one end of a webbing W is fastened to the take-up spindle 24 in a manner known per se in the art for restraint of the occupant. On one end portion of the take-up spindle 24 which one end portion projects outwardly from the side plate 22, there is fixedly secured a cogwheel 26 having teeth 25 formed with a constant interval in the outer circumference thereof. Below the take-up spindle 24, a lock lever 28 is supported between the side plates 22 and 23 of the casing 1. The pawl 27 of the lock lever 28 can assume a first position where it is brought into engagement with either one of the teeth 25 of the cogwheel 26 so as to prevent any further rotation of the take-up spindle 24 and a second position where it is out of engagement with the cogwheel 26. An auxiliary plate 29 is attached to the side plate 22 as an integral unit with the side plate 22 in such a way that the auxiliary plate 29 covers up the cogwheel 26 and the pawl 27 of the lock lever 28.

The auxiliary plate 29 is made preferably of a material which is not susceptible of undergoing easy deformation, for example, a metal or fiber-reinforced plastics.

In addition, the casing 20 is provided with a sensor mechanism so as to shift the lock lever 28 to the first position, i.e., to a position where the lock lever 28 is engageable with the cogwheel 26. This sensor mechanism is however unillustrated because it is irrelevant to the subject matter of the present invention.

Figure 1A:
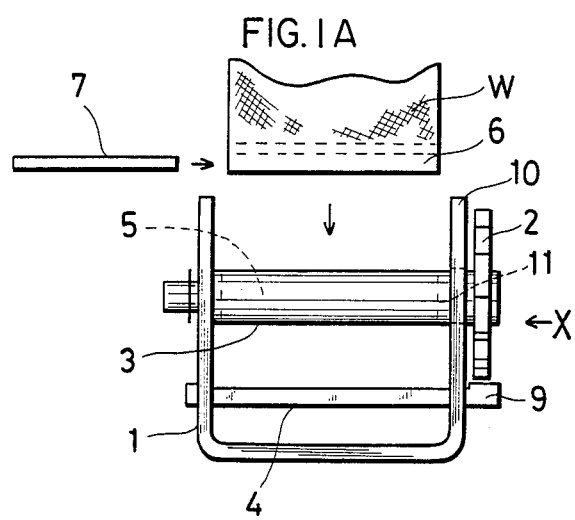
FIGS. 1(a) and 1(b) are respectively a simplified front view and side view of a conventional webbing retractor.
Figure 1B:
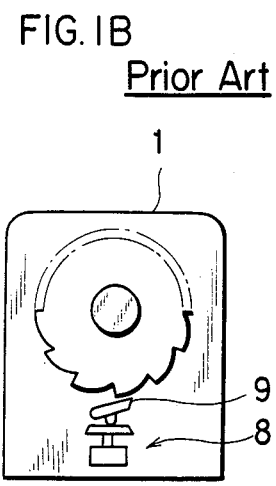
Figure 2:
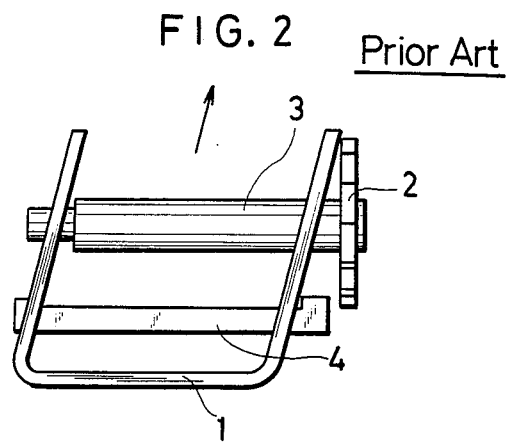
FIGS. 2 through 6 are schematic illustrations of conventional webbing retractors deformed in various ways.
Figure 5:
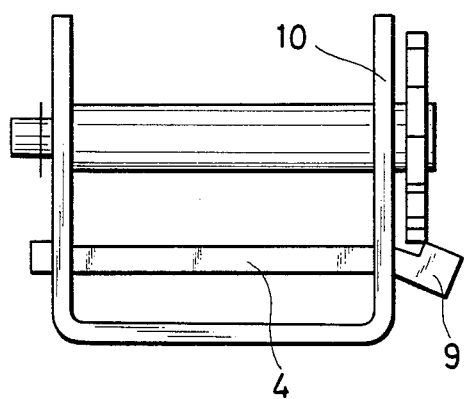

In the above embodiment, the lock lever 28 is brought into engagement with the cogwheel 26 in the event of an emergency such as a vehicle collision or the like, thereby inhibiting further rotation of the take-up spindle 24 and thus preventing further withdrawal of the webbing W. Even if the webbing W is pulled in the direction indicated by D (see, FIG. 8), the take-up spindle 24 is brought into contact with the auxiliary plate 29 as an interlocking portion and supported by the same auxiliary plate 29. This prevents the take-up spindle 24 from being forced rightward. Accordingly, the cogwheel 26 and lock lever 28 are protected from disengagement without assuming their respective positions as shown in FIG. 2, thereby preventing any further rotation of the take-up spindle 24 without any failure. The auxiliary plate 29 is also close to the pawl 27 of the lock lever 28. Even if the pawl 27 is subjected to a bending moment and is about to undergo such deformation as shown in FIG. 5, the end face 30 of the pawl 27 is thus brought into contact with the auxiliary plate 29 likewise as an interlocking portion and supported there and the lock lever 28 is therefore protected from any further deformation. According to this embodiment, the lock lever 28 and cogwheel 26 are maintained in an engaged state and the take-up spindle 24 is thus prevented from any further rotation without failure.

Figure 9:
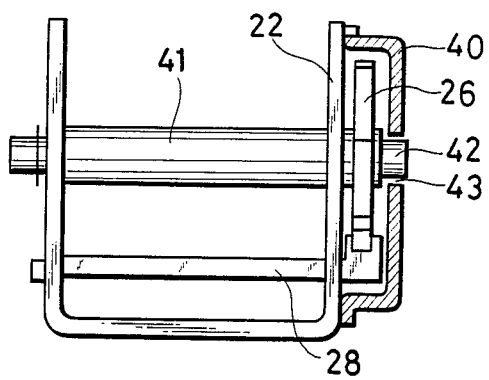
FIG. 9 is a front view of a webbing retractor according to the second embodiment of this invention.

Referring next to FIG. 9, the second embodiment of this invention will be described. In the following description, all parts which are not different from their corresponding parts in the first embodiment will be omitted. In the second embodiment, the auxiliary plate 40 defines a bore 43 which is engageable as an interlocking portion with an extension 42 of the take-up spindle 41. Alternatively, the auxiliary plate may define as an interlocking portion, instead of the bore, a recess which receives the extension of the take-up spindle or a projection which is received in a recess formed in the take-up spindle.

Figure 3A:
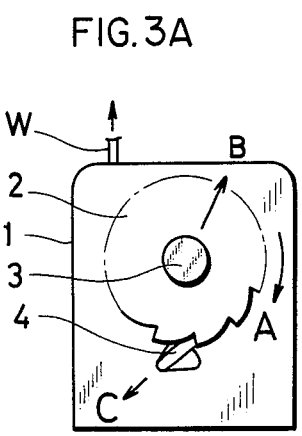
Figure 3B:
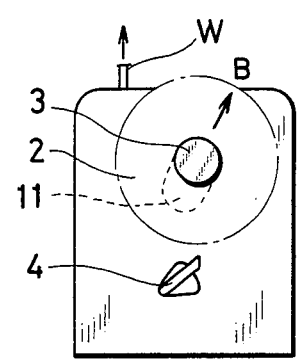
Figure 4:
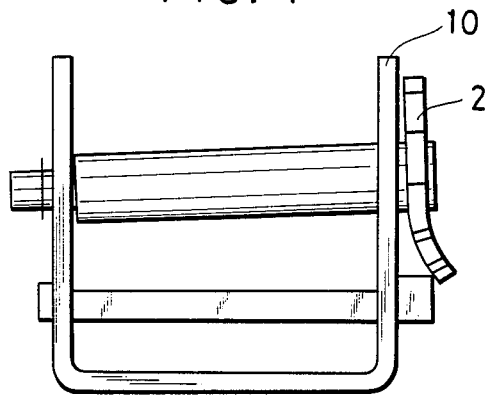

Owing to the above construction, the extension 42 of the take-up spindle is brought into engagement with the bore 43 and supported by the same bore and is thus prevented from any further displacement even when the spindle 26 is brought into engagement with the lock lever 28 and a force is applied to the take-up spindle 41 in the direction indicatd by B shown in FIG. 3(b). The cogwheel 26 is brought into contact with the auxiliary plate 40 in like manner as an interlocking portion and supported there and is thus protected from any further deformation even if such a deformation as shown in FIG. 4 occurs, because the auxiliary plate 40 is provided close to the cogwheel 26. Therefore, the engagement between the cogwheel and lock lever is maintained and the take-up spindle 41 is prevented from any further rotation without failure.

Figure 3C:
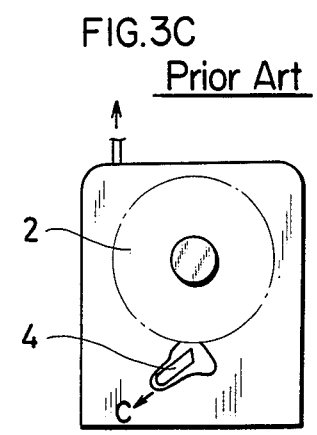
Figure 6:
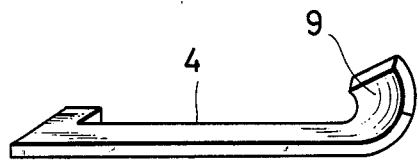
Figure 10A:
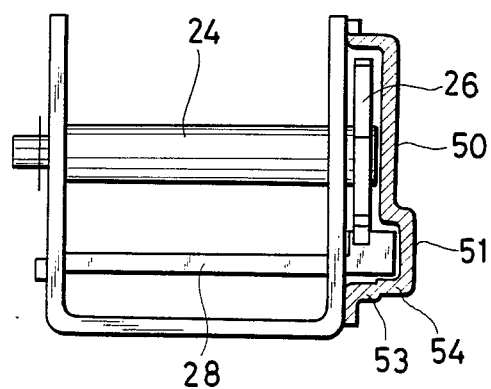
FIGS. 10(a) and 10(b) are respectively front and side views of a webbing retractor according to the third embodiment of this invention.
Figure 10B:
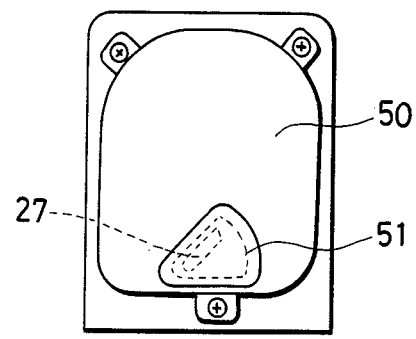

Next, reference is made to FIGS. 10(a) and 10(b) for the description of the third embodiment of this invention. In the present embodiment, the auxiliary plate 50 defines an outwardly swollen portion 51 as an interlocking portion adjacent its lower wall 53. Lower wall 53 forms an outer circumferential or peripheral surface extending in the axial direction of the take-up spindle 24 as a like interlocking portion. When a large rotary force is exerted on the take-up spindle 24 while the lock lever 28 and cogwheel 26 are kept in mutual engagement, the pawl 27 of the lock lever 28 which pawl 27 is interlocked with the cogwheel 26 is caused to undergo twisting in the counterclockwise direction as seen in FIG. 10(b). No further deformation however takes place after the pawl 27 has been brought into contact with the outwardly-swollen portion 51 of the auxiliary plate 50 and supported there. Thus, the lock lever 28 can be kept in engagement with the cogwheel without undergoing such a deformation as shown in FIG. 6. When a force is applied in the direction indicated by C in FIG. 3 to the pawl 27 of the lock lever 28 and the side plate 22 of the casing 20 starts to deform or the lock lever 28 itself starts to undergo deformation as shown in FIG. 5 under the influence of a similar force, the pawl 27 is brought into contact with the lower wall 54 of the outwardly-swollen portion 51 of the auxiliary plate 50 or the lower wall 53 of the auxiliary plate 50 as a corresponding interlocking portion and is thus successfully protected from any further deformation. Furthermore, such a deformation as shown in FIG. 5 can also be avoided in the same manner as that employed in the first embodiment.

The third embodiment may be modified and the auxiliary plate may include as an interlocking portion a bore engageable with the pawl 27 of the lock lever 28 or a projection confronting the side plate instead of the outwardly-swollen portion.

Figure 11:
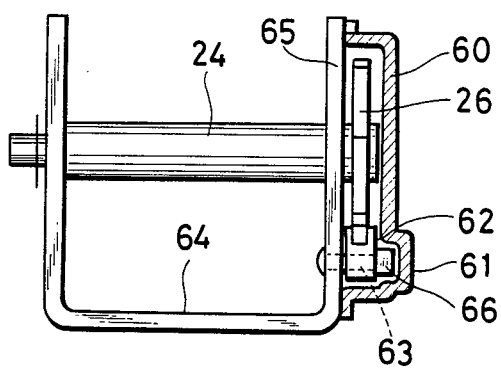
FIG. 11 is a front view of a webbing retractor according to the fourth embodiment of this invention.

Referring next to FIG. 11, the fourth embodiment of this invention will be described. In the present embodiment, a lock lever 62 is supported on a side wall 65 of a casing 64 via a pin 63. On the other hand, an auxiliary plate 60 defines a recess 61 which is engageable as an interlocking portion with a head 66 of the pin 63. When a force is exerted or the lock lever 62 and the pin 63 starts to undergo deformation, the head 66 of the pin 63 is brought into engagement with the recess 61 of the auxiliary plate 60 and supported there, thereby being protected from any further deformation. This permits the maintaining of the engagement between the lock lever 62 and cogwheel 26 and the preventing of rotation of the take-up spindle 24 without failure. As a modification to the above embodiment, it is possible to provide the auxiliary plate with an outwardly-swollen portion as an interlocking portion which portion is engageable with the lock lever. In this modified embodiment, the engagement between the lock lever and the cogwheel can be maintained even if the pin is subjected to deformation, because the lock lever is brought into engagement with the outwardly-swollen portion and supported there.

Figure 12A:
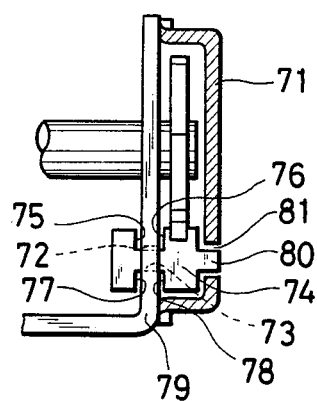
FIGS. 12(a) and 12(b) are respectively front and side views of a webbing retractor according to the fifth embodiment of this invention.
Figure 12B:
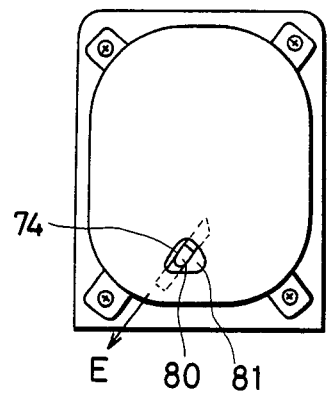

Now, reference is made to FIGS. 12(a) and 12(b) which illustrate the fifth embodiment of this invention. A lock lever 74 which is supported at a lower face 73 thereof on the edge of a guide hole 72 defines limit faces 75,76,77,78 which serve to restrict lateral movements of the lock lever 74. Owing to the provision of the limit faces 75,76,77,78, the lock lever 74 is prevented from being dropped from a side plate 79 of the casing. On the side plate 79, there is provided an auxiliary plate 71 defining a bore 81 as an interlocking portion which is engageable with an extension 80 of the lock lever 74. When a force is applied to the lock lever 74 in the direction indicated by E, the limit faces 75,78 are first of all brought into contact with the side plate 79 of the casing. When a further force is applied to the lock lever 74, the extension 80 of the lock lever 74 is brought into supported engagement with the bore 81 of the auxiliary plate 71 and the lock lever 74 is thus protected from any further deformation.

In each of the above embodiments, the side plate is provided as an integral unit with the auxiliary plate as a member separate from the casing. It is feasible to bend the side plate further into an auxiliary plate, i.e. as a one piece structure integral unit.

The sensor mechanism, which is omitted from the drawings, may be either of the automatic locking type in which the lock lever is automatically shifted to its engagement position whenever the webbing is paid out or of the emergency locking type in which the lock lever is displaced to its engagement position in the event of an emergency of the vehicle.

Having now fully described the invention, it will be apparent to one of ordinary skill in the art that many changes and modifications can be made thereto without departing from the spirit or scope of the invention as set forth herein.

What is claimed is:

1. A webbing retractor comprising a casing equipped with a pair of side plates, a take-up spindle rotatably supported by the side plates and having a webbing fastened to the take-up spindle at one end thereof, a cog wheel provided outside one of the side plates in such a way that it is allowed to rotate together with the take-up spindle, a lock member having a portion extending in the axial direction of the take-up spindle and supported by at least one of the side plates in such a manner that the lock member is displaceable between a first position where the lock member is kept in engagement with the cog wheel and a second position where the lock member is out of engagement with the cog wheel, an auxiliary plate having a radially extending substantially flat surface disposed outside the cog wheel substantially as an integral unit with the one of the side plates said plate including an axially outwardly extending swollen portion on said substantially flat surface, said swollen portion having a shoulder which extends in the axial direction of the take-up spindle and overlaps at a part thereof with the portion of the lock member which portion extends in the axial direction of the take-up spindle, and means mounting the auxiliary plate in such a manner that the shoulder of the auxiliary plate is normally kept out of engagement with the portion of the lock member, which portion extends in the axial direction of the take-up spindle, but when a tensile force is applied to the webbing and the lock member is thus deformed or displaced in a direction parallel to the radial direction of the take-up spindle, the portion of the lock member which portion extends in the axial direction of the take-up spindle is thereby correspondingly brought into contact and engagement with the shoulder of the auxiliary plate whereby to support the lock member.

2. Retractor of claim 1, wherein an attachment member is provided on said at least one of the side plates so that the lock member is supported via the attachment member on said at least one of the side plates.

3. A webbing retractor comprising a casing equipped with a pair of side plates, a take-up spindle rotatably supported by the side plates and having a webbing fastened to the take-up spindle at one end thereof, a cog wheel provided outside one of the side plates in such a way that it is allowed to rotate together with the take-up spindle, a lock member supported by at least one of the side plates in such a manner that the lock member is displaceable between a first position where the lock member is kept in engagement with the cog wheel and a second position where the lock member is out of engagement with the cog wheel, an auxiliary plate disposed outside the cog wheel substantially as an integral unit with the one of the side plates and defining an opening as an interlocking portion engageable with the lock member, and means mounting the auxiliary plate in such a manner that the opening of the auxiliary plate is normally kept out of engagement with the lock member but when a tensile force is applied to the webbing and the lock member is thus deformed or displaced in a direction parallel to the radial direction of the take-up spindle, the lock member is thereby correspondingly brought into engagement with the opening of the auxiliary plate whereby to support the lock member.

* * * * *